US011407335B2

(12) United States Patent
Tanabe et al.

(10) Patent No.: US 11,407,335 B2
(45) Date of Patent: Aug. 9, 2022

(54) VEHICLE SEAT

(71) Applicant: TS TECH CO., LTD., Saitama (JP)

(72) Inventors: Jinichi Tanabe, Tochigi (JP); Kenichi Niitsuma, Tochigi (JP); Hidetoshi Ozawa, Tochigi (JP)

(73) Assignee: TS Tech Co., LTD., Saitama (JP)

(*) Notice: Subject to any disclaimer, the term of this patent is extended or adjusted under 35 U.S.C. 154(b) by 300 days.

(21) Appl. No.: 16/624,030

(22) PCT Filed: Jun. 13, 2018

(86) PCT No.: PCT/JP2018/022630
§ 371 (c)(1),
(2) Date: Dec. 18, 2019

(87) PCT Pub. No.: WO2018/235700
PCT Pub. Date: Dec. 27, 2018

(65) Prior Publication Data
US 2020/0215938 A1 Jul. 9, 2020

(30) Foreign Application Priority Data

Jun. 20, 2017 (JP) .............................. JP2017-120605

(51) Int. Cl.
B60R 21/207 (2006.01)
B60N 2/14 (2006.01)
(Continued)

(52) U.S. Cl.
CPC ................ B60N 2/14 (2013.01); B60N 2/06 (2013.01); B60N 2/4279 (2013.01); B60R 21/207 (2013.01)

(58) Field of Classification Search
CPC ........ B60R 21/207; B60R 2021/23146; B60R 2021/01231; B60N 2/14
See application file for complete search history.

(56) References Cited

U.S. PATENT DOCUMENTS 9,744,933 B1 * 8/2017 Rao ..................... B60R 21/0136
9,868,414 B2 * 1/2018 Ohno .................... B60R 21/207
(Continued)

FOREIGN PATENT DOCUMENTS

JP H10324221 12/1998
JP 11078999 A * 3/1999
(Continued)

OTHER PUBLICATIONS

Toshimichi Tokunaga, Airbag System for Vehicle, Mar. 23, 1999, EPO, JP 11-78999 A, Machine Translation of Description (Year: 1993).*

(Continued)

Primary Examiner — James A English
(74) Attorney, Agent, or Firm — Dority & Manning, P.A.

(57) ABSTRACT

Provided is a vehicle seat that is rotatable relative to a vehicle body and can prevent a collision between an object located around a seat body and an occupant by airbags. A vehicle seat includes: a seat body (6) supported by a vehicle body (2b) so as to be rotatable around a substantially vertical axis; a pair of airbags (17) provided on either lateral side edge of the seat body and configured to deploy to respective lateral sides of an occupant seated on the seat body; a rotation angle detecting device (15) provided on the seat body and configured to detect a rotation angle of the seat body relative to the vehicle body; and a control device (22) configured to control deploying operation of the respective airbags independently of each other. The deploying operation includes a deploying amount and/or a deploying timing. The control device is configured to individually control the deploying operation of the pair of airbags according to the rotation angle detected by the rotation angle detecting device.

4 Claims, 13 Drawing Sheets

(51) Int. Cl.
    *B60N 2/06*     (2006.01)
    *B60N 2/427*     (2006.01)

(56) References Cited

U.S. PATENT DOCUMENTS

| | | | |
|---|---|---|---|
| 11,027,689 B2* | 6/2021 | Nagasawa | B60R 21/207 |
| 11,052,853 B2* | 7/2021 | Choi | B60R 21/015 |
| 2014/0042733 A1 | 2/2014 | Fukawatase et al. | |
| 2015/0066308 A1 | 3/2015 | Nagasawa | |
| 2015/0197209 A1* | 7/2015 | Fujiwara | B60R 21/231 |
| | | | 280/730.1 |
| 2016/0082915 A1 | 3/2016 | Madaras | |
| 2016/0272141 A1* | 9/2016 | Oh | B60R 21/0134 |
| 2017/0247006 A1* | 8/2017 | Rao | B60R 21/18 |
| 2017/0267205 A1 | 9/2017 | Numazawa | |
| 2021/0221315 A1* | 7/2021 | Deng | B60R 21/233 |

FOREIGN PATENT DOCUMENTS

| | | |
|---|---|---|
| JP | H11170961 | 6/1999 |
| JP | 2005297846 | 10/2005 |
| JP | 2008155725 | 7/2008 |
| JP | 2008232694 | 10/2008 |
| JP | 2010064632 | 3/2010 |
| JP | 2013216209 | 10/2013 |
| JP | 2014034356 | 2/2014 |
| JP | 2015044533 | 3/2015 |
| JP | 2016097780 | 5/2016 |
| JP | 2016175513 | 10/2016 |
| JP | 2017170941 | 9/2017 |

OTHER PUBLICATIONS

Okano et al., Airbag Control Device for Vehicle, Jun. 29, 1999, EPO, JP 11-170961 A, Machine Translation of Description (Year: 1999).*
International Search Report for PCT/JP2018/0226230 dated Jul. 13, 2018, 4 pages.
Supplementary European Search Report for EP18820364 dated Nov. 23, 2020, 8 pages.

* cited by examiner

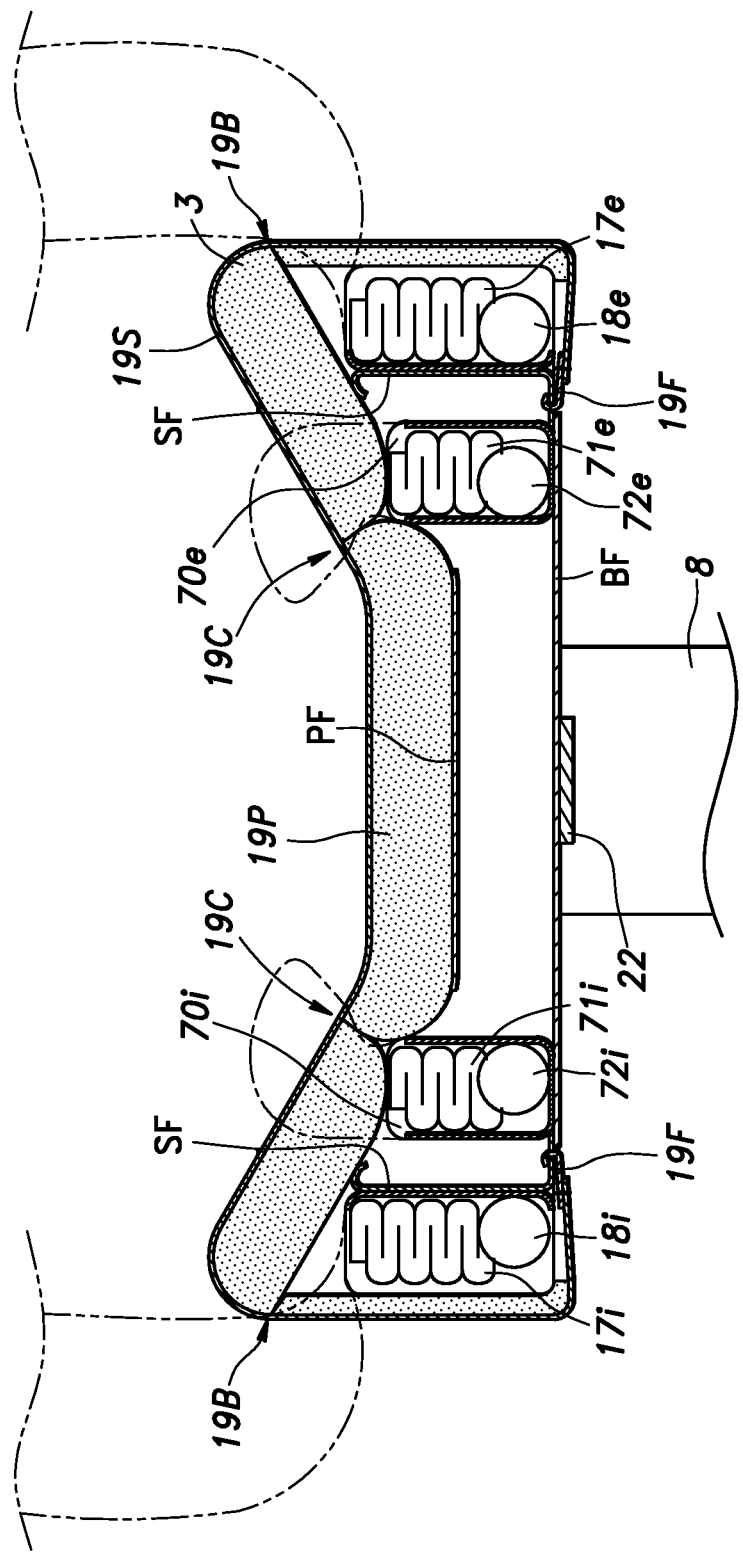

VEHICLE SEAT

CROSS REFERENCE TO RELATED APPLICATIONS

This application is the U.S. National Stage entry of International Application Number PCT/JP2018/022630 filed under the Patent Cooperation Treaty having a filing date of Jun. 13, 2018, which claims priority to Japanese Patent Application No. 2017-120605 having a filing date of Jun. 20, 2017, which are incorporated herein by reference.

TECHNICAL FIELD

The present invention relates to a vehicle seat that is rotatable relative to a vehicle body.

BACKGROUND ART

A conventionally proposed rotation seat device can rotate adjacent vehicle seats around a substantially vertical line relative to a vehicle body (for example, Patent Document 1). In the rotation seat device described in Patent Document 1, seat bodies rotate to inboard sides relative to the vehicle body so that adjacent seat bodies move to the positions where the persons seated thereon face each other.

PRIOR ART DOCUMENT(S)

Patent Document(s)

Patent Document 1: JP2016-097780A

SUMMARY OF THE INVENTION

Task to be Accomplished by the Invention

In a usual vehicle seat, an airbag is provided on an outboard edge of a seat body. The airbag deploys between an occupant and a vehicle body at the time of collision to prevent the occupant from colliding with the vehicle body. However, with regard to a vehicle seat that can rotate around a substantially vertical line relative to the vehicle body, the direction of the occupant relative to the vehicle body is not fixed. Therefore, it is not easy to deploy the airbag such that the occupant does not collide with an object located around the seat body at the time of collision.

In view of such a background, an object of the present invention is to provide a vehicle seat that is rotatable relative to a vehicle body and can prevent a collision between an object located around a seat body and an occupant by airbags.

Means for Accomplishing the Task

To achieve the above object, a vehicle seat (1) is provided. The vehicle seat includes: a seat body (6) supported by a vehicle body (2b) so as to be rotatable around a substantially vertical axis; a pair of airbags (17) provided on either lateral side edge of the seat body and configured to deploy to respective lateral sides of an occupant seated on the seat body; a rotation angle detecting device (15) provided on the seat body and configured to detect a rotation angle of the seat body relative to the vehicle body; and a control device (22) configured to control deploying operation of the respective airbags independently of each other, the deploying operation including a deploying amount and/or a deploying timing, wherein the control device is configured to individually control the deploying operation of the pair of airbags according to the rotation angle detected by the rotation angle detecting device.

According to this aspect, the airbag to be deployed is selected according to the rotation angle of the seat body relative to the vehicle body, so that the occupant can be protected at the time of collision.

Also, in the above aspect, preferably, the control device is configured to deploy the airbag (17i) located on an inboard side when the rotation angle is within an inward rotation range, in which a front end of the seat body is located on the inboard side at a time of a collision.

According to this aspect, it is possible to prevent the collision between the occupants seated on adjacent seats, since the airbag is deployed between adjacent seat bodies in a case where the seat bodies rotate to the inboard sides and the adjacent seat bodies are located in the positions to face each other.

Also, in the above aspect, preferably, the control device is configured to make the deploying amount of the airbag located on the inboard side larger than the deploying amount of the airbag (17e) located on an outboard side when the rotation angle is within the inward rotation range, in which the front end of the seat body is located on the inboard side at the time of the collision.

According to this aspect, it is possible to further prevent the collision between the occupants seated on adjacent seats, since the airbag located on the inboard side is selectively deployed largely when the seat body rotates to the inboard side.

Also, in the above aspect, preferably, the control device is configured to make the deploying amount of the airbag located on an outboard side larger than the deploying amount of the airbag located on the inboard side when the rotation angle is out of the inward rotation range at the time of the collision.

According to this aspect, it is possible to prevent the occupant from colliding with the vehicle body, since the airbag located on the outboard side is selectively deployed largely when the seat body rotates to the outboard side.

Also, in the above aspect, preferably, the control device is configured to deploy the airbag located on an outboard side when the rotation angle is within an inward rotation range, in which a front end of the seat body is located on an inboard side at a time of a collision.

According to this aspect, it is possible to prevent the collision between the occupant and an object in front of the occupant, since the airbag is deployed in front of the occupant when a forward load is applied to the occupant due to a front collision or the like.

Also, in the above aspect, preferably, the control device is configured to make the deploying amount of the airbag located on the outboard side larger than the deploying amount of the airbag located on the inboard side when the rotation angle is within the inward rotation range, in which the front end of the seat body is located on the inboard side at the time of the collision.

According to this aspect, it is possible to further prevent the collision between the occupant and an object in front of the occupant, since the airbag is deployed largely in front of the occupant when a forward load is applied to the occupant due to a front collision or the like.

Also, in the above aspect, preferably, the control device is configured to make the deploying amount of the airbag located on the inboard side larger than the deploying amount of the airbag located on the outboard side when the rotation angle is out of the inward rotation range at the time of the collision.

According to this aspect, it is possible to prevent the collision between the occupant and an object in front of the occupant, since the airbag is deployed in front of the occupant when a forward load is applied to the occupant due to a front collision or the like.

Also, in the above aspect, preferably, the vehicle seat further includes a pair of actuators (20) provided in a seat cushion (3) of the seat body and configured to protrude independently on respective lateral side edges of an upper face of the seat cushion, wherein the control device is configured to make the actuator (20i) located on the inboard side protrude when the rotation angle is within the inward rotation range at the time of the collision and to make the actuator (20e) located on an outboard side protrude when the rotation angle is out of the inward rotation range at the time of the collision.

According to this aspect, it is possible to prevent the collision between the occupant and an object located on the left and right of the vehicle seat, since the occupant is guided to move forward relative to the vehicle body by driving either of the actuators.

Also, in the above aspect, preferably, a vehicle seat includes: a seat body supported by a vehicle body so as to be rotatable around a substantially vertical axis; a pair of airbags (17) provided on either lateral side edge of the seat body and configured to deploy to respective lateral sides of an occupant seated on the seat body; an acceleration detecting device (50) provided on the seat body and configured to detect acceleration applied to the seat body; and a control device (22) configured to independently control deploying operation of the respective airbags, the deploying operation including at least one of a deploying amount and a deploying timing, wherein the control device is configured to control the deploying operation of the pair of airbags according to the acceleration detected by the acceleration detecting device at a time of a collision.

According to this aspect, it is possible to prevent the collision between the occupant and an object located in the direction of the force of inertia applied to the occupant, since the deploying operation of the airbags is controlled according to the direction of acceleration applied to the seat body.

Also, in the above aspect, preferably, the control device is configured to estimate a moving direction of the occupant seated on the seat body based on the acceleration and to make the deploying amount of the airbag located in the moving direction larger than the deploying amount of another airbag.

According to this aspect, it is possible to prevent the collision between the occupant and an object located in the moving direction of the occupant relative to the occupant, since the deploying operation of the airbags is controlled according to the movement direction of the occupant estimated at the time of collision.

Also, in the above aspect, preferably, the vehicle seat further includes: a rotation angle detecting device provided on the seat body and configured to detect a rotation angle of the seat body relative to the vehicle body; and a pair of actuators (20) provided in a seat cushion (3) of the seat body and configured to protrude independently on respective lateral side edges of an upper face of the seat cushion, wherein the control device is configured to make the actuator (20i) located on an inboard side protrude when the rotation angle is within an inward rotation range, in which a front end of the seat body is located on the inboard side, at the time of the collision and to make the actuator (20e) located on an outboard side protrude when the rotation angle is out of the inward rotation range at the time of the collision.

According to this aspect, it is possible to prevent the collision between the occupant and an object located in the moving direction of the occupant relative to the occupant, as either of the airbags located in the moving direction of the occupant estimated at the time of collision is deployed. Furthermore, it is possible to prevent the collision between the occupant and an object located on the left and right of the vehicle seat, since the occupant is guided to move forward relative to the vehicle body by driving either of the actuators.

Effect of the Invention

According to one aspect of the present invention, it is possible to provide a vehicle seat that is rotatable relative to a vehicle body and can prevent a collision between an object located around a seat body and an occupant by airbags.

Also, in one aspect of the present invention, the airbag located on an inboard side is deployed when the rotation angle is within an inward rotation range, in which a front end of the seat body is located on the inboard side. Accordingly, it is possible to prevent the collision between the occupants seated on adjacent seats, since the airbag is deployed between adjacent seat bodies in a case where the seat bodies rotate to the inboard sides and the adjacent seat bodies are located in the positions to face each other.

Also, in one aspect of the present invention, the deploying amount of the airbag located on the inboard side is larger than the deploying amount of the airbag located on an outboard side when the rotation angle is within the inward rotation range, in which the front end of the seat body is located on the inboard side at the time of the collision. Accordingly, it is possible to further prevent the collision between the occupants seated on adjacent seats.

Also, in one aspect of the present invention, the deploying amount of the airbag located on an outboard side is larger than the deploying amount of the airbag located on the inboard side when the rotation angle is out of the inward rotation range at the time of the collision. Accordingly, it is possible to prevent the occupant from colliding with the vehicle body.

Also, in one aspect of the present invention, the airbag located on an outboard side is deployed when the rotation angle is within an inward rotation range, in which a front end of the seat body is located on an inboard side at a time of a collision. Accordingly, it is possible to prevent the collision between the occupant and an object in front of the occupant, since the airbag is deployed in front of the occupant when a forward load is applied to the occupant due to a front collision or the like.

Also, in one aspect of the present invention, the deploying amount of the airbag located on the outboard side is larger than the deploying amount of the airbag located on the inboard side when the rotation angle is within the inward rotation range, in which the front end of the seat body is located on the inboard side at the time of the collision. Accordingly, it is possible to further prevent the collision between the occupant and an object in front of the occupant, since the airbag is deployed largely in front of the occupant when a forward load is applied to the occupant due to a front collision or the like.

Also, in one aspect of the present invention, the deploying amount of the airbag located on the inboard side is larger than the deploying amount of the airbag located on the outboard side when the rotation angle is out of the inward rotation range at the time of the collision. Accordingly, it is possible to prevent the collision between the occupant and an object in front of the occupant, since the airbag is deployed in front of the occupant when a forward load is applied to the occupant due to a front collision or the like.

Also, in one aspect of the present invention, the vehicle seat further includes a pair of actuators provided in a seat cushion of the seat body and configured to protrude independently on respective lateral side edges of an upper face of the seat cushion, and the control device is configured to make the actuator located on the inboard side protrude when the rotation angle is within the inward rotation range at the time of the collision and to make the actuator located on an outboard side protrude when the rotation angle is out of the inward rotation range at the time of the collision. Accordingly, it is possible to prevent the collision between the occupant and an object located on the left and right of the vehicle seat, since the occupant is guided to move forward relative to the vehicle body.

According to one aspect of the present invention, it is possible to prevent the collision between the occupant and an object located in the direction of the force of inertia applied to the occupant, since the deploying operation of the pair of the airbags is controlled according to the acceleration detected by the acceleration detecting device.

Also, in one aspect of the present invention, the moving direction of the occupant is estimated and the deploying amount of the airbag located in the moving direction is set to be large. Accordingly, it is possible to prevent the collision between the occupant and an object located in the moving direction of the occupant relative to the occupant.

Also, in one aspect of the present invention, the vehicle seat further includes the rotation angle detecting device and the pair of actuators. Accordingly, it is possible to prevent the collision between the occupant and an object located in the moving direction of the occupant relative to the occupant, as either of the airbags located in the moving direction of the occupant estimated at the time of collision is deployed. Furthermore, it is possible to prevent the collision between the occupant and an object located on the left and right of the vehicle seat, since the occupant is guided to move forward relative to the vehicle body by driving either of the actuators.

BRIEF DESCRIPTION OF THE DRAWING(S)

FIG. 13 shows another embodiment of a seat cushion of a vehicle seat.

MODE(S) FOR CARRYING OUT THE INVENTION

In the following, four embodiments of a vehicle seat according to the present invention are described with reference to FIGS. 1 to 13.

First Embodiment

Figure 1:
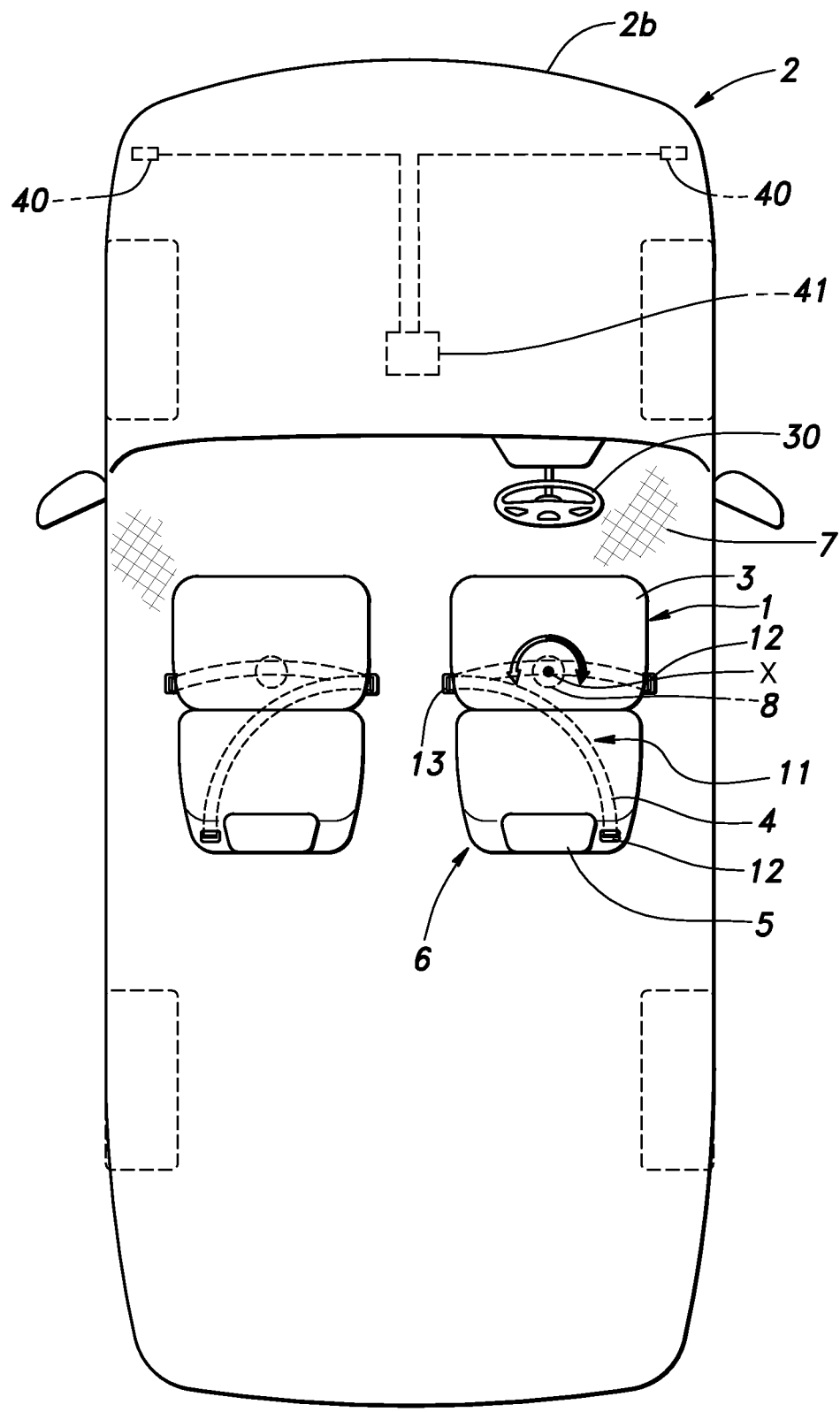
FIG. 1 is a schematic view of a vehicle equipped with a vehicle seat according to a first embodiment.

A vehicle seat 1 according to the present invention is a seat mounted on a vehicle 2, and FIG. 1 shows an example that the vehicle seat 1 is used as a driver's seat. The vehicle seat 1 includes a seat body 6, and the seat body 6 includes a seat cushion 3 that supports the occupant's buttocks and thighs, a seat back 4 that supports the occupant's back, and a headrest 5 that is coupled to an upper side of the seat back 4 and is disposed at a position corresponding to a head of the occupant. The seat body 6 is rotatably coupled to a floor 7 of a vehicle body 2*b* via a support shaft 8 extending substantially vertically. The seat body 6 can rotate relative to the floor 7 around an axis X that passes through the support shaft 8 and is substantially vertical, from a state (see FIG. 1) where the seat body 6 faces the front of the vehicle body 2*b* to an inboard side (a direction of a white arrow in FIG. 1; hereinafter referred to as an inward rotation) in which a front end of the seat cushion 3 is located on the inboard side, and an outboard side (a direction of a black arrow in FIG. 1; hereinafter referred to as an outward rotation) in which the front end of the seat cushion 3 is located on the outboard side.

A vehicle body control device 41 is mounted on the vehicle 2 of the present embodiment. The vehicle body control device 41 includes a memory and a central processing unit including a plurality of input/output ports, and can control traveling of the vehicle 2. The driver (occupant) can switch the traveling of the vehicle 2 between manual traveling which the occupant controls and autonomous traveling which is controlled by the vehicle body control device 41. At the time of the manual traveling, the seat body 6 is locked by the vehicle body control device 41 in a state where the seat body 6 faces the front of the vehicle body 2*b*. At the time of the autonomous traveling, the seat body 6 is unlocked by the vehicle body control device 41, and the seat body 6 becomes rotatable relative to the floor 7. At the time of the autonomous traveling, the occupant can be seated at a position to face another occupant seated on the seat body 6 of an adjacent passenger seat by rotating the seat body 6 inward. The occupant can enjoy an outboard scenery by rotating the seat body 6 outward. In the present embodiment, the seat body 6 is set to be capable of rotating 90 degrees inward and 90 degrees outward from the state where the seat body 6 faces the front of the vehicle body 2*b*.

The vehicle seat 1 is provided with a three-point seat belt 11. Two anchor points 12 that serve as fixing points of the seat belt 11 are respectively provided on an outboard upper end of the seat back 4 and an outboard side portion of the seat cushion 3. A buckle 13 that serves as a fixing point of the seat belt 11 is provided on an inboard side portion of the seat cushion 3. Thus, the two anchor points 12 and the buckle 13 are coupled to the seat body 6, so that the seat belt 11 restrains the occupant to the seat back 4 and the seat cushion 3 regardless of a rotation of the seat body 6 relative to the vehicle body 2b.

Figure 3:
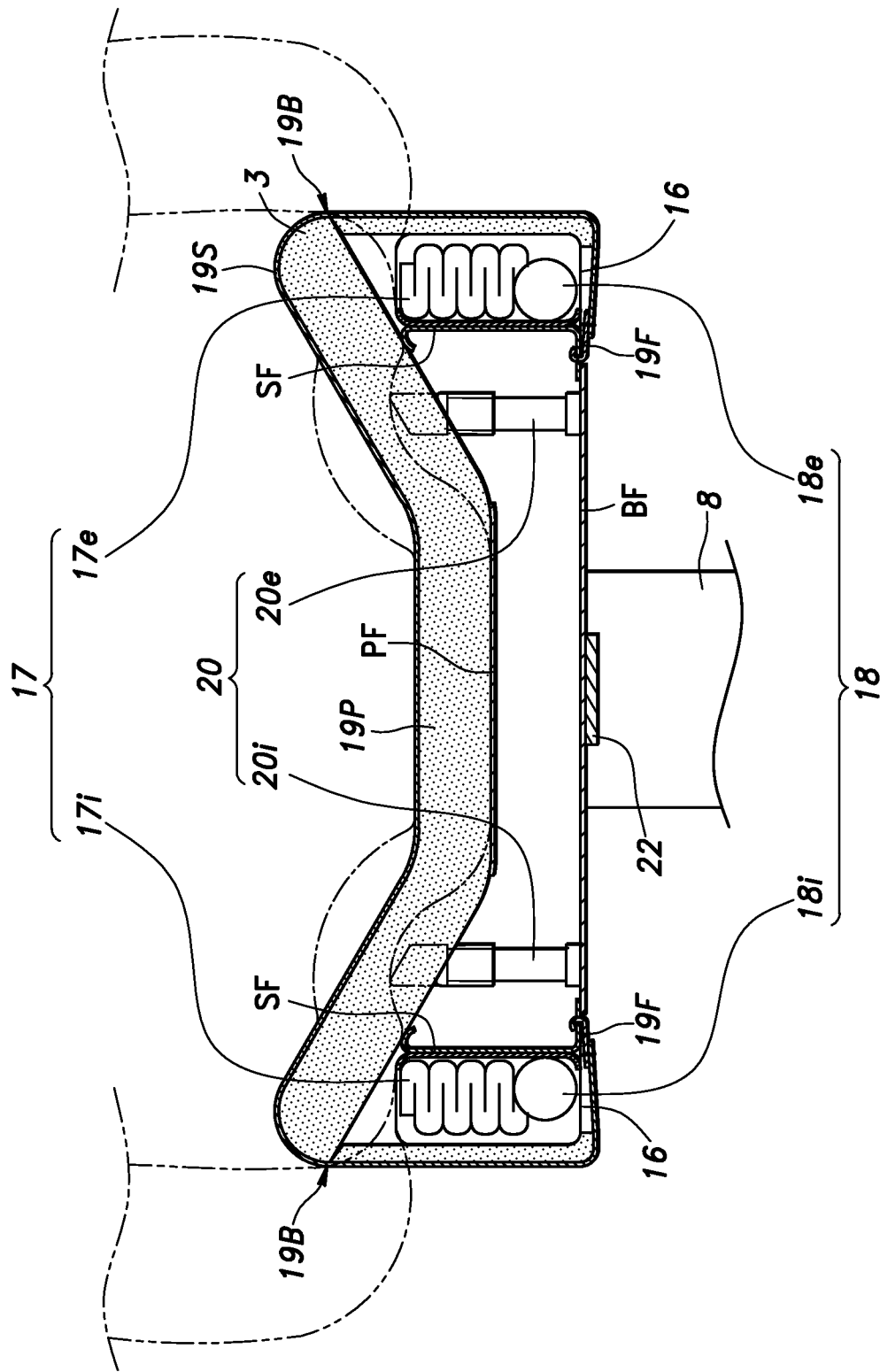
FIG. 3 is a sectional view taken along a line III-III in FIG. 2.

As shown in FIG. 3, the seat cushion 3 includes a pair of left and right side frames SF that extend in the fore-and-aft direction, a front frame (not shown) and a rear frame (not shown) that connect front ends of the side frames SF to each other and rear ends of the side frames SF to each other, and a pan frame PF that is formed in a flat plate shape and connects the front frame and the rear frame in the fore-and-aft direction.

A pair of left and right casings 16 that open outward in the lateral direction are coupled to left and right outer walls of the left and right side frames SF, respectively. A pair of airbags 17 that can be respectively deployed to the left and right of the seat cushion 3 and a pair of inflators 18 that deploy the airbags 17 are housed in the casings 16. Airbags 17 are housed in the casings 16 in a folded state. The inflators 18 each include an input part (not shown) to receive a signal, and discharge gas inside the corresponding airbags 17 to inflate (deploy) the airbags 17 (see two-dot chain lines in FIGS. 2 and 3), when the signal to request operation is input to the input part. In the following, the airbag 17 and the inflator 18 provided on the inboard side of the seat cushion 3 are respectively referred to as an inboard airbag 17i and an inboard inflator 18i, based on the occupant seated on the seat body 6 facing forward. Similarly, the airbag 17 and the inflator 18 provided on the outboard side of the seat cushion 3 are respectively referred to as an outboard airbag 17e and an outboard inflator 18e, based on the occupant seated on the seat body 6 facing forward.

A pad 19P is provided so as to cover the side frames SF, the front frame, the rear frame, and the pan frame PF. Left and right ends of the pad 19P pass through left and right outsides of the casings 16 and extend to lower sides of the casings 16. The surface of the pad 19P is covered with a skin material 19S, and a pair of left and right engagement members 19F are stitched to respective lateral ends of the skin material 19S. The engagement members 19F are respectively engaged with lower sides of the side frames SF to join the pad 19P and the skin material 19S to the side frames SF. Slits 19B are respectively provided at respective lateral upper ends of the pad 19P, and stitched portions (not shown) are provided at portions of the skin material 19S covering the slits 19B. At the time of deployment, the airbags 17 expand from openings of the casings 16 to pass through the slits 19B, break the stitched portions, and reach at least a height equal to or higher than a substantial center of the seat back 4 in the vertical direction from respective lateral sides of the seat cushion 3, and preferably, reach a height equal to or higher than an upper end of the headrest 5 (see two-dot chain lines in FIG. 3). At the time of deployment, respective lateral sides of the occupant are covered with the airbags.

A bottom frame BF having a horizontal plate shape is provided between the left and right side frames SF. Respective lateral ends of the bottom frame BF are coupled to lower ends of the left and right side frames SF. The support shaft 8 is coupled to a lower face of the bottom frame BF.

A pair of left and right actuators 20 are provided between the bottom frame BF and the pad 19P. The actuators 20 are provided on respective lateral edges of the bottom frame BF, and lower ends of the actuators 20 are respectively coupled to the bottom frame BF. Upper ends of the actuators respectively abut a lower face of the pad 19P. Each of the actuators 20 extends upward in a substantially vertical direction to push up the pad 19P upon receiving a signal that requests driving. According to this, respective lateral side portions of an upper face of the seat cushion 3 protrude (see one-dot chain lines in FIG. 3). In the following, the actuator 20 provided on the inboard side of the seat cushion 3 is referred to as an inboard actuator 20i and the actuator 20 provided on the outboard side of the seat cushion 3 is referred to as an outboard actuator 20e, based on the occupant seated on the seat body 6 facing forward.

Figure 2:
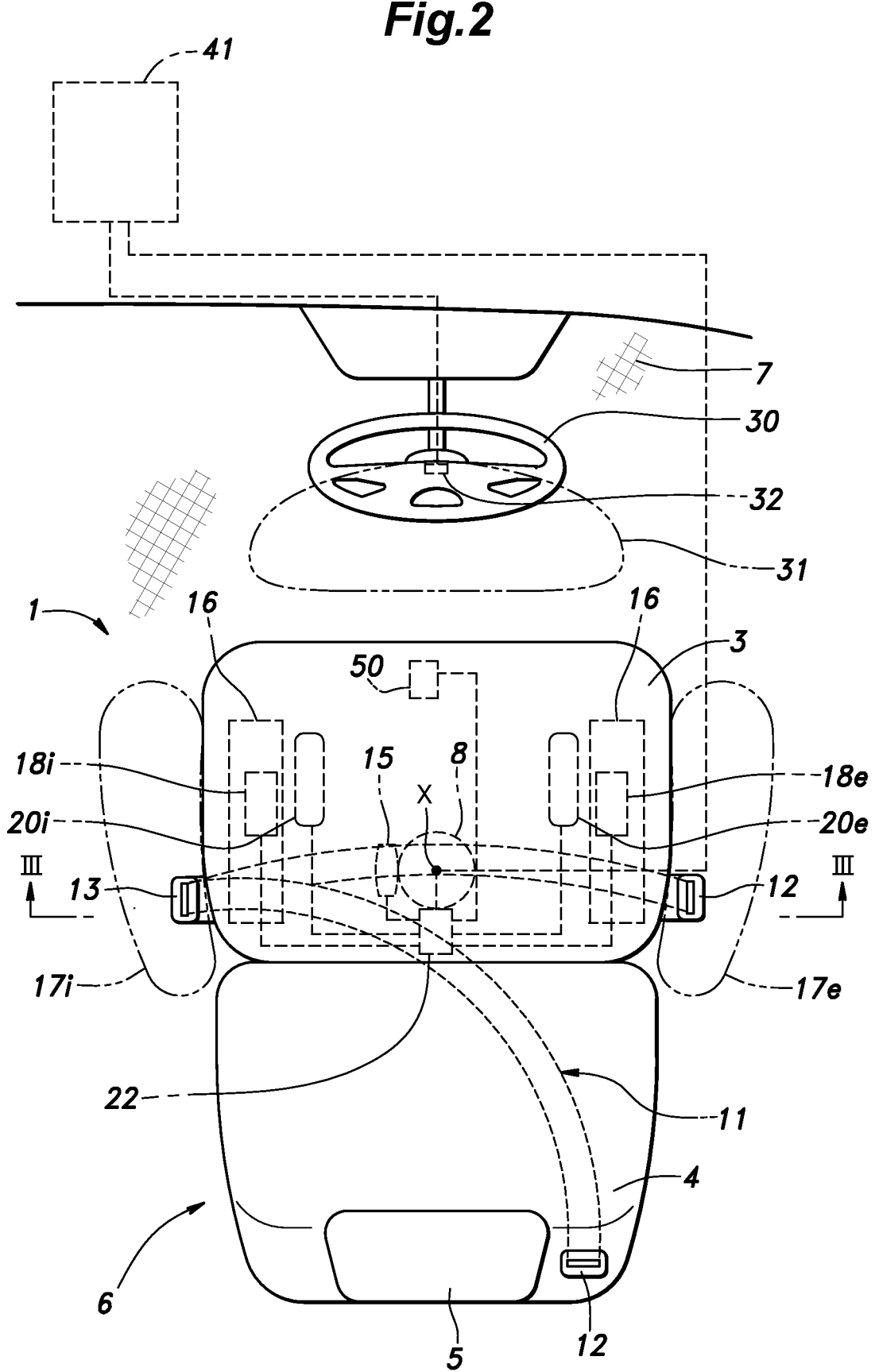
FIG. 2 is an enlarged view of the vehicle seat.

As shown in FIG. 2, a rotation angle sensor 15 (rotation angle detecting device) that detects a rotation angle $\theta$ between the seat body 6 and the vehicle body 2b is provided in a lower part of the seat cushion 3. Any sensor that detects the rotation angle between the seat body 6 and the vehicle body 2b may be used as the rotation angle sensor 15. For example, a rotary encoder or a rotary potentiometer may be used as the rotation angle sensor 15. The rotation angle $\theta$ obtained by the rotation angle sensor 15 is defined such that the rotation angle $\theta$ is positive ($\theta > 0$) when the seat cushion 3 rotates outward and the rotation angle $\theta$ is negative ($\theta < 0$) when the seat cushion 3 rotates inward, provided that the front of the vehicle body 2b is defined as a basis (0 degree). A variable range of $\theta$ is $-90$ degrees$\leq \theta \leq 90$ degrees, since the seat body 6 can rotate 90 degrees inward and 90 degrees outward relative to the vehicle body 2b. In the following, a range of $\theta < 0$ is described as an inward rotation range, and a range of $\theta > 0$ is described as an outward rotation range, if necessary.

The vehicle seat 1 includes a control device 22 provided on a lower face of the bottom frame BF. The control device 22 includes a memory and a central processing unit including a plurality of input/output ports to which the rotation angle sensor 15, the inflators 18, and the actuators 20 are connected. Further, one port of the output ports functions as a trigger port to receive a trigger signal that instructs the deployment of the airbags 17. The control device 22 can obtain the rotation angle $\theta$ of the seat body 6 relative to the vehicle body 2b based on the output from the rotation angle sensor 15. Further, the control device 22 can send a signal that requests operation to the inboard inflator 18i and the outboard inflator 18e independently to each other at a predetermined timing. Therefore, the control device 22 can control deploying operation including the deployment and the timing of the deployment of the inboard airbag 17i and the outboard airbag 17e. Further, the control device 22 can independently send a signal that requests driving to the inboard actuator 20i and the outboard actuator 20e, and can independently control extension/contraction of the inboard actuator 20i and the outboard actuator 20e.

As shown in FIG. 2, a steering wheel 30 is provided in front of the vehicle seat 1. An airbag 31 is provided in a substantially central portion of the steering wheel 30. In FIG. 2, a deploying state of the airbag 31 is shown by a two-dot chain line. The airbag 31 restricts forward movement of the occupant at the time of deployment and prevents the occupant from colliding with the steering wheel 30. An inflator 32 for controlling the deployment of the airbag 31 is provided in the steering wheel 30. The inflator 32 is connected to the input/output port of the vehicle body control device 41.

As shown in FIG. 1, the vehicle body 2b that constitutes the vehicle 2 is provided with a plurality of collision detecting sensors 40 for detecting a collision. In the present embodiment, the collision detecting sensors 40 are consisted of known pressure sensors and disposed at left and right front ends of the vehicle body 2b to detect pressures applied to the left and right front ends of the vehicle body 2b. The collision detecting sensors 40 are connected to the input/output port of the vehicle body control device 41.

The trigger port of the control device 22 is connected to the input/output port of the vehicle body control device 41. The vehicle body control device 41 can send a trigger signal, which instructs the deployment of the airbags 17 provided in the seat body 6, to the control device 22.

The vehicle body control device 41 sends a signal that instructs the deployment to the inflator 32 and sends a signal that instructs the deployment of the airbags 17 to the control device 22, when the pressures detected by the collision detecting sensors 40 are equal to or greater than a prescribed threshold value corresponding to a front collision of the vehicle 2. The control device 22 performs an airbag deploying process upon receiving a signal that instructs the deployment of the airbags 17. In the following, the details of the airbag deploying process performed by the control device 22 are described with reference to FIG. 4.

First, the control device 22 obtains the rotation angle θ from the rotation angle sensor 15 upon receiving the signal that instructs the deployment of the airbags 17 (step ST1). Next, the control device 22 determines whether the rotation angle θ is negative (θ<0), i.e. whether the rotation angle θ is within the inward rotation range (step ST2). The control device 22 sends a signal that requests operation to the inboard inflator 18i and a signal that requests driving to the inboard actuator 20i when the rotation angle is within the inward rotation range (step ST3). The control device 22 sends a signal that requests operation to the outboard inflator 18e and a signal that requests driving to the outboard actuator 20e when the rotation angle is not within the inward rotation range (when the rotation angle is out of the inward rotation range, i.e. θ≥0) (step ST4). The control device 22 completes the airbag deploying process when sending of the signal (step ST3 or ST4) is completed.

Figure 5:
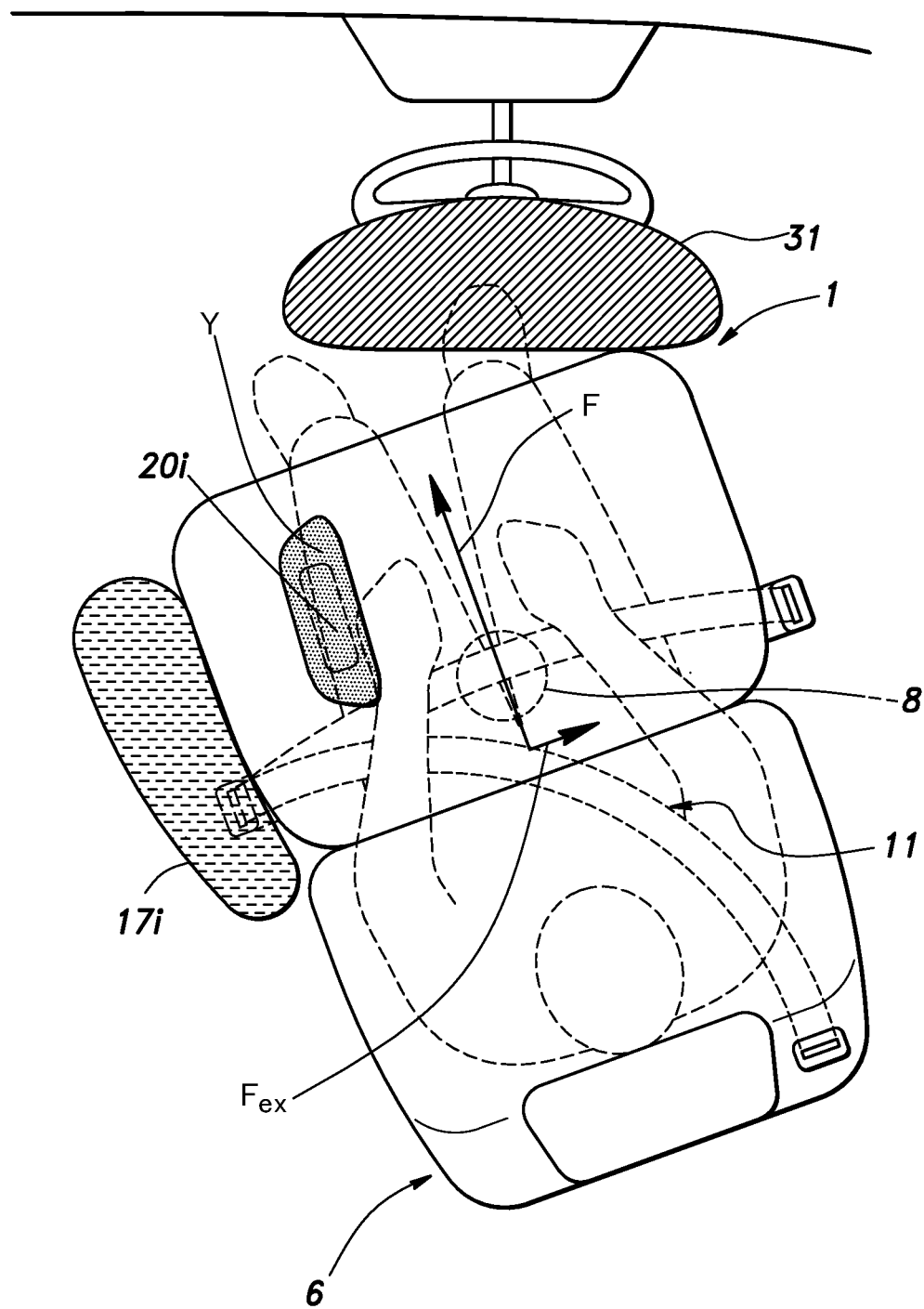
FIG. 5 is an explanatory diagram of the deployment of one airbag at a time of a front collision when a seat body rotates inward in the vehicle seat according to the first embodiment.
Figure 6:
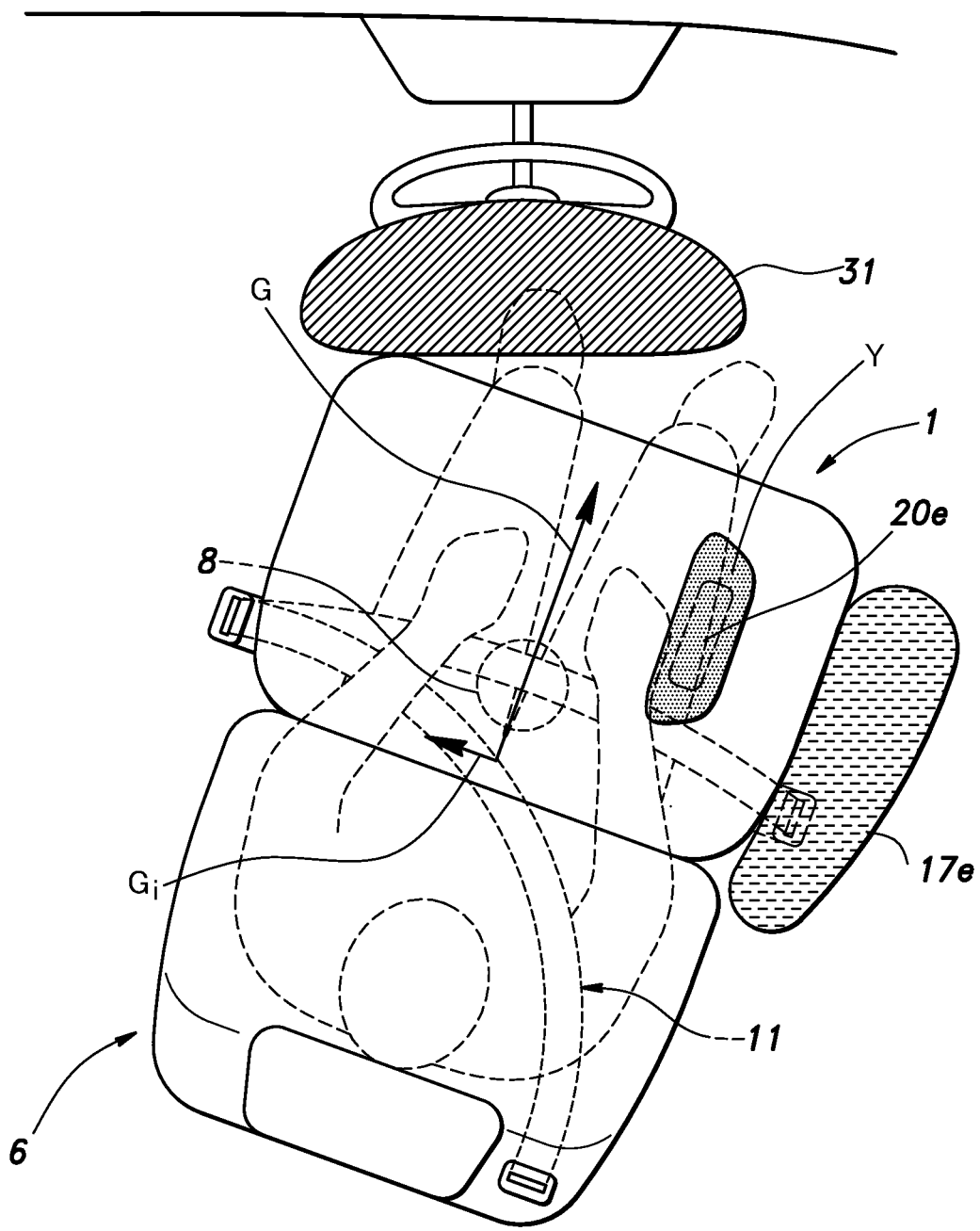
FIG. 6 is an explanatory diagram of the deployment of the other airbag at the time of the front collision when the seat body rotates outward in the vehicle seat according to the first embodiment.

Next, the effect of the vehicle seat 1 having the aforementioned structure is described with reference to FIGS. 5 and 6. In FIGS. 5 and 6, the airbag 31 at the time of deployment and the deployed one of the inboard airbag 17i and the outboard airbag 17e mounted on the seat body 6 are shaded. Further, a portion Y of the upper face of the seat cushion 3 protruding upward by driving of the actuators 20 is also shaded.

FIG. 5 is an explanatory diagram showing the deployment of one airbag 17 when the vehicle 2 is in the front collision in a state where the seat body 6 rotates inward. At the time of the front collision, the force of inertia toward the front of the vehicle body 2b is applied to the occupant. Further, a tension that corrects a moving direction of the occupant to the front of the seat body 6 is applied to the occupant by the seat belt 11. A resultant force F (see an arrow in FIG. 5) of the force of inertia and the tension by the seat belt 11 is applied to the occupant, and the resultant force F is directed to the front of the seat body 6.

As shown in FIG. 5, the resultant force F is directed to the inboard side relative to the vehicle body 2b, and therefore, the occupant may move to the inboard side to cause a collision between the occupants adjacent to each other. In the first embodiment, the control device 22 sends a signal that requests operation to the inboard inflator 18i when the rotation angle θ is within the inward rotation range (θ<0) at the time of the front collision. Therefore, the inboard inflator 18i is driven and the inboard airbag 17i is deployed to cover an inboard side portion of the occupant. According to this, movement of the occupant to the inboard side is restricted, so that the collision between the occupants adjacent to each other is prevented. In this way, the inboard airbag 17i located on the inboard side to which the occupant is likely to move is selectively deployed, so that the occupant can be effectively protected without deploying all the airbags 17.

Along with the deployment of the inboard airbag 17i, a signal that requests driving of the inboard actuator 20i is sent from the control device 22, and the inboard actuator 20i is extended accordingly. By this extension, an inboard edge (see Y in FIG. 5) of the upper face of the seat cushion 3 protrudes upward, so that an inboard side thigh of the occupant is pushed up. Therefore, a force $F_{ex}$ (see an arrow in FIG. 5) to the outboard side is applied to the occupant, and the occupant is guided to move forward relative to the vehicle body 2b. The kinetic energy of the occupant moving forward is consumed at the airbag 31 deployed from the steering wheel 30 to the front of the occupant, so that the occupant is effectively protected.

FIG. 6 is an explanatory diagram showing the deployment of the other airbag 17 when the vehicle 2 is in the front collision in a state where the adjacent seat bodies 6 rotate outward together. At this time, the resultant force G of the force of inertia and the tension by the seat belt 11 is applied to the occupant. The resultant force G is directed to the front of the seat body 6 (a direction of an arrow in FIG. 6), and the occupant moves to the outboard side relative to the vehicle body 2b.

Due to the movement of the occupant to the outboard side, the occupant may collide with a side wall of the vehicle body 2b. The control device 22 sends a signal that requests operation to the outboard inflator 18e when the rotation angle θ is out of the inward rotation range (θ≥0). Therefore, the outboard airbag 17e is deployed as shown in FIG. 6, so that the occupant is prevented from colliding with the side wall of the vehicle body 2b.

Further, a signal that requests driving of the outboard actuator 20e is sent from the control device 22, and the outboard actuator 20e is extended accordingly. By this extension, an outboard edge (see Y in FIG. 6) of the upper face of the seat cushion 3 protrudes upward, so that an outboard side thigh of the occupant is pushed up. Therefore, a force $G_i$ (see an arrow in FIG. 6) to the inboard side is applied to the occupant, and the occupant is guided to move forward relative to the vehicle body 2b. Accordingly, a collision between the occupant and an object located on the left and right of the seat body 6 is prevented. Further, the kinetic energy of the occupant moving forward is consumed at the airbag 31 deployed from the steering wheel 30 to the front of the occupant, so that the occupant is protected.

Second Embodiment

The vehicle seat 1 of the second embodiment differs from the vehicle seat 1 of the first embodiment only in steps ST3 and ST4 of the airbag deploying process.

Figure 7:
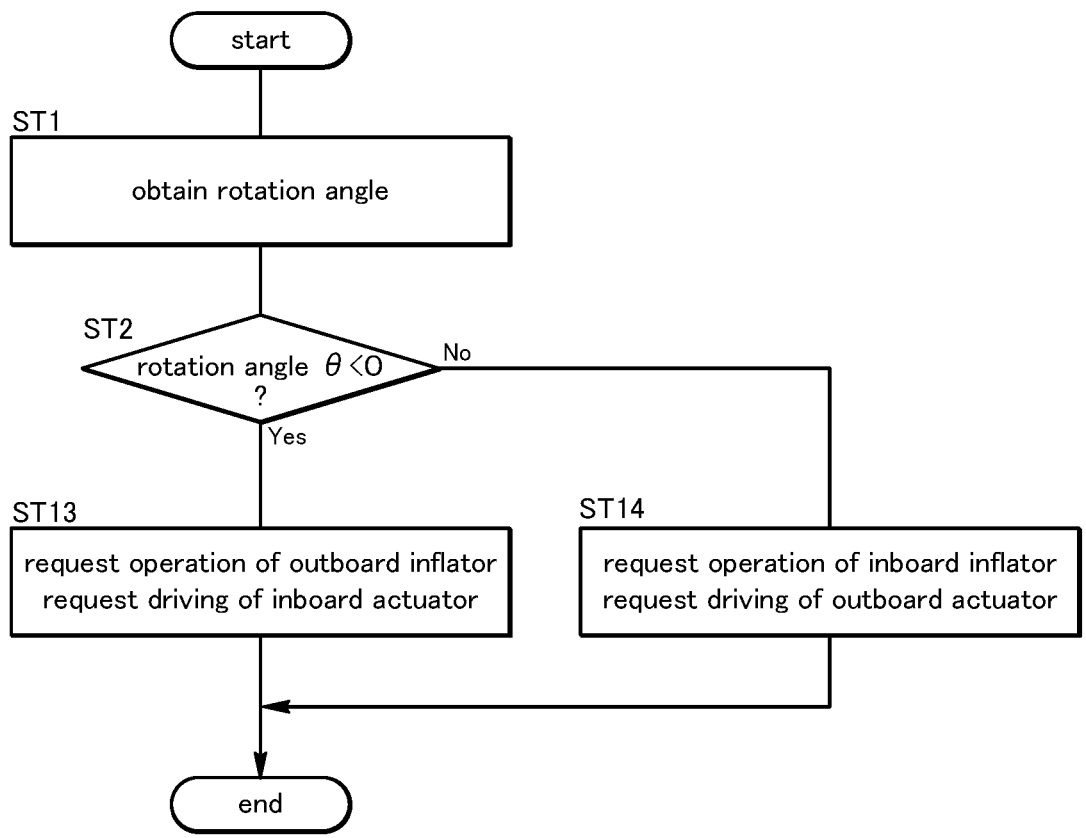
FIG. 7 is a flowchart of an airbag deploying process of a vehicle seat according to a second embodiment.

FIG. 7 shows the airbag deploying process of the control device 22 provided in the vehicle seat 1 of the second embodiment. Instead of step ST3 in FIG. 4, the control device 22 sends a signal that requests operation to the outboard inflator 18e and a signal that requests driving to the inboard actuator 20i when the rotation angle θ is within the inward rotation range (θ<0) (step ST13). Instead of step ST4 in FIG. 4, the control device 22 sends a signal that requests operation to the inboard inflator 18i and a signal that requests driving to the outboard actuator 20e when the rotation angle θ is not within the inward rotation range (when the rotation angle θ is out of the inward rotation range; θ≥0) (step ST14).

The effect of the vehicle seat 1 having the aforementioned structure is described with reference to FIGS. 8 and 9. If a speed of the vehicle body 2b is greatly reduced at the time of the front collision, there is a case where the force of inertia applied to the occupant by deceleration of the vehicle body 2b becomes sufficiently larger than the tension applied to the occupant by the seat belt 11. At this time, a resultant force (see arrows in FIGS. 8 and 9) of the tension and the force of inertia is directed along the front of the vehicle body 2b, and the occupant moves substantially forward relative to the vehicle body 2b.

Figure 8:
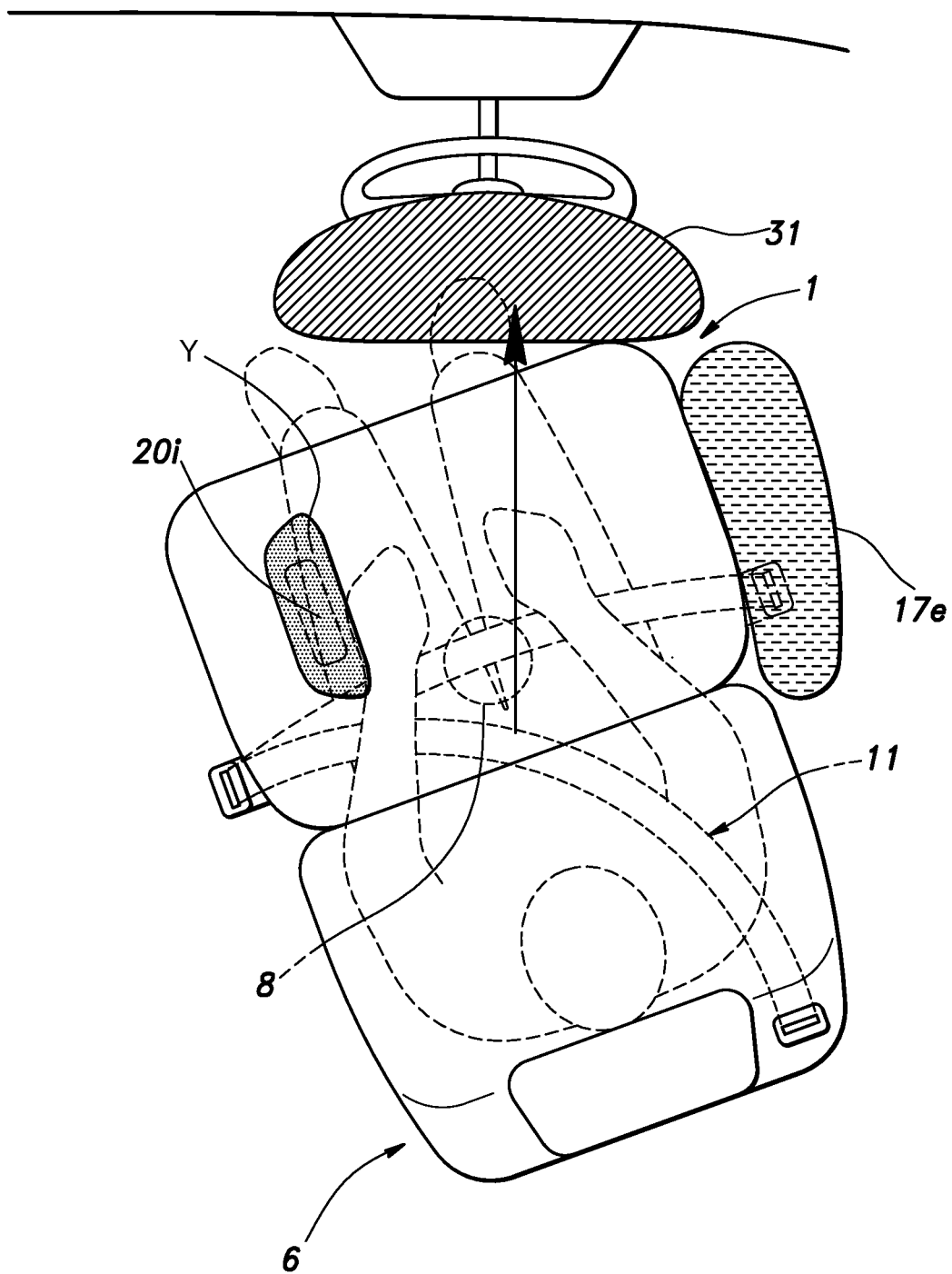
FIG. 8 is an explanatory diagram of the deployment of one airbag at a time of a front collision when a seat body rotates inward in the vehicle seat according to the second embodiment.
Figure 9:
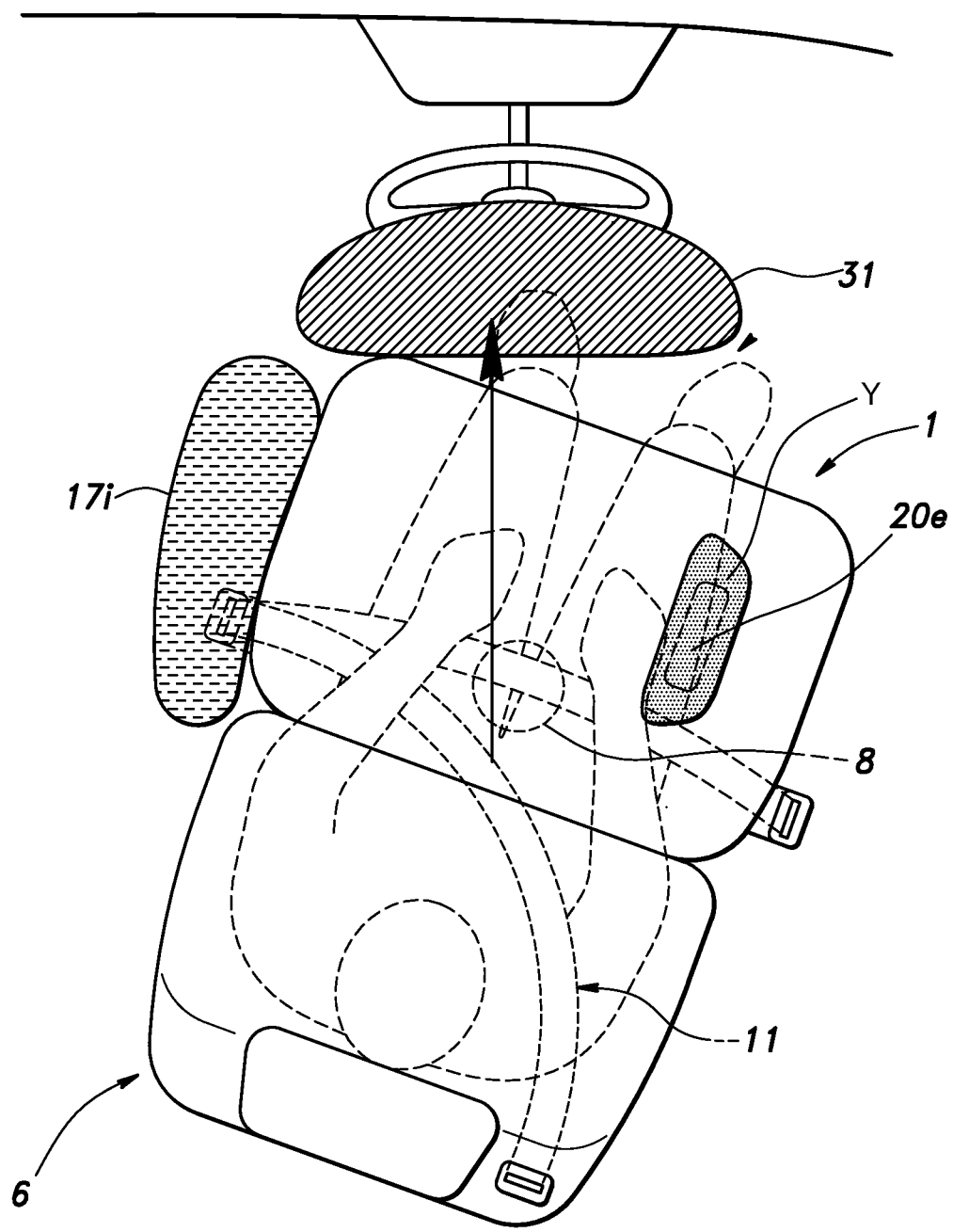
FIG. 9 is an explanatory diagram of the deployment of the other airbag at the time of the front collision when the seat body rotates outward in the vehicle seat according to the second embodiment.

FIG. 8 is an explanatory diagram showing the deployment of one airbag 17 at the time of the front collision in a state where the seat body 6 rotates inward. As shown in FIG. 8, the outboard airbag 17e is deployed at the time of the front collision in the state where the seat body 6 rotates inward. FIG. 9 is an explanatory diagram showing the deployment of the other airbag 17 at the time of the front collision in a state where the seat body 6 rotates outward. At this time, the inboard airbag 17i is deployed. As shown in FIGS. 8 and 9, in both cases, either of the airbags 17 located in front of the occupant moving by the front collision is selectively deployed, so that the occupant can be protected effectively.

Third Embodiment

The vehicle seat 1 of the third embodiment differs from that of the first embodiment in an airbag deploying process (see FIG. 10) and an acceleration sensor 50 (acceleration detecting device) (see FIG. 2) that is provided in the seat body 6 to detect acceleration applied to the seat body 6. The acceleration sensor 50 is provided on a lower face of the seat cushion 3 to detect a component α of the acceleration in a lateral direction relative to the seat body 6 (Hereinafter, referred to as a component of acceleration in a seat lateral direction) applied to the seat body 6. At this time, the component α of the acceleration in the seat lateral direction is defined such that the direction to the outboard side is positive when the seat body 6 is disposed to face forward relative to the vehicle body 2b. The acceleration sensor 50 is connected to the control device 22, and outputs the component α (positive or negative) of the acceleration in the seat lateral direction to the control device 22.

Figure 10:
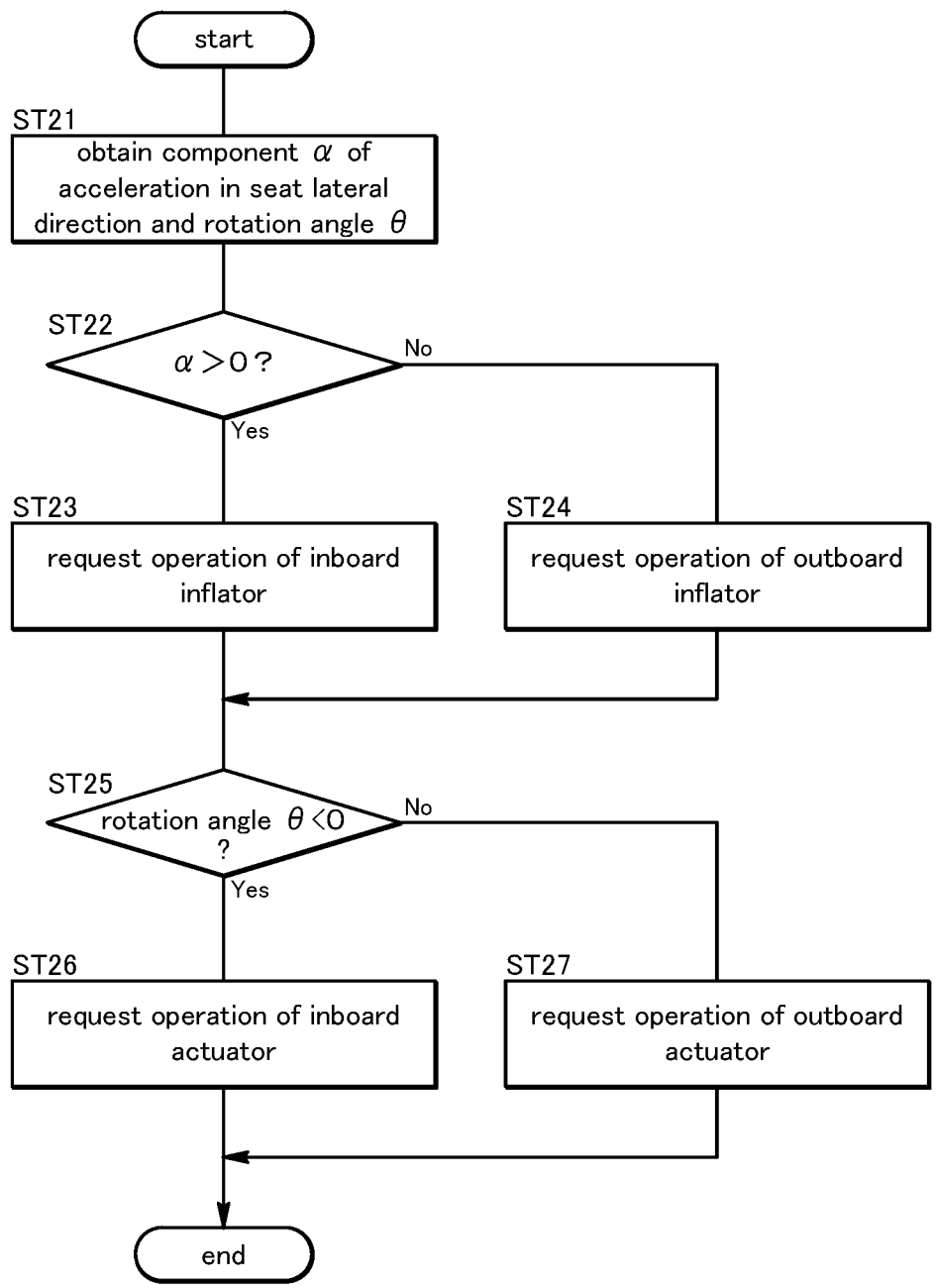
FIG. 10 is a flowchart of an airbag deploying process of a vehicle seat according to a third embodiment.

FIG. 10 is a flowchart of the airbag deploying processing performed by the control device 22 of the vehicle seat 1 according to the third embodiment. In the first step of the airbag deploying process, the control device 22 obtains the component α of the acceleration in the seat lateral direction applied to the seat body 6 and the rotation angle θ (step ST21). Next, the control device 22 determines whether or not the component α of the acceleration in the seat lateral direction is positive (step ST22). When α is positive (α>0), the control device 22 outputs a signal that requests operation of the inboard inflator 18i (step ST23). When α is not positive (α≤0), the control device 22 outputs a signal that requests operation of the outboard inflator 18e (step ST24). Thereafter, the control device 22 determines whether the rotation angle θ is within the inward rotation range (θ<0) (step ST25). When the rotation angle θ is within the inward rotation range, the control device 22 outputs a signal that requests driving of the inboard actuator 20i (step ST26). When the rotation angle θ is not within the inward rotation range, the control device 22 outputs a signal that requests driving of the outboard actuator 20e (step ST27).

Next, the effect of the vehicle seat 1 having the aforementioned structure is described. The inboard airbag 17i is deployed when the component α of the acceleration in the seat lateral direction is positive. When the component α of the acceleration in the seat lateral direction is positive, the occupant receives the force of inertia toward the inboard side relative to the seat body 6, since the direction of the force of inertia applied to the occupant is opposite to the direction of acceleration applied to the seat body 6. The occupant moves to the inboard side relative to the seat body 6 according to the force of inertia, and the inboard airbag 17i that is one of the airbags 17 located in the moving direction of the occupant is deployed. Movement of the occupant in the lateral direction of the seat body 6 due to the force of inertia is restricted by the deployment of the inboard airbag 17i. In this manner, the control device 22 determines the direction of the force of inertia applied to the occupant by determining whether α is positive or negative, and estimates the moving direction of the occupant. Further, the control device 22 deploys either of the airbags 17 located on a side of the moving direction of the occupant based on the estimation thereof.

In the vehicle seat 1, the inboard actuator 20i is driven when the rotation angle θ is within the inward rotation range and the outboard actuator 20e is driven when the rotation angle θ is not within the inward rotation range. By driving the actuators 20, the moving direction of the occupant is corrected so as to be directed forward relative to the vehicle body 2b, so that the collision between the occupants and the collision of the occupant with the side wall of the vehicle body 2b are prevented. Further, the kinetic energy of the occupant moving forward relative to the vehicle body 2b is consumed at the airbag 31 deployed from the steering wheel 30 to the front of the occupant, so that the occupant is effectively protected.

Fourth Embodiment

Figure 11:
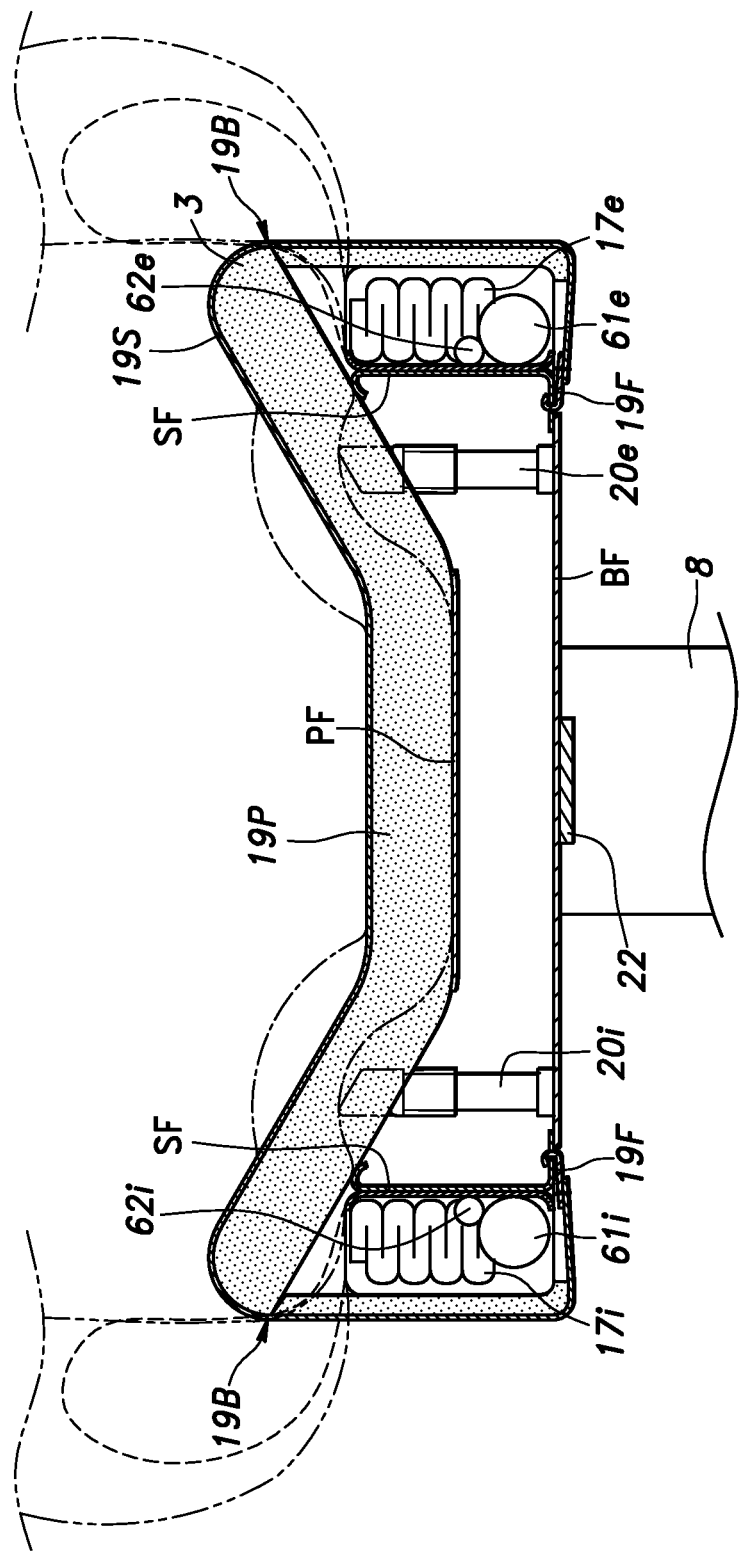
FIG. 11 is a sectional view of a seat cushion of a vehicle seat according to a fourth embodiment.

The vehicle seat 1 according to the fourth embodiment differs from that of the first embodiment in a pair of inflators 18 corresponding to each of the airbags 17 and operation of the control device 22 in steps ST3 and ST5 of the airbag deploying process. As shown in FIG. 11, a first outboard inflator 61e and a second outboard inflator 62e having different discharging amounts of gas are provided in the casing 16 on the outboard side provided in the seat cushion 3 of the vehicle seat 1. A first inboard inflator 61i and a second inboard inflator 62i having different discharging amounts of gas are provided in the casing 16 on the inboard side provided in the seat cushion 3 of the vehicle seat 1.

When the first outboard inflator 61e (first inboard inflator 61i) is operated, the outboard airbag 17e (inboard airbag 17i) is deployed to cover respective lateral sides of the seat cushion 3 and the seat back 4 in the same way as the first embodiment (see two-dot chain lines in FIG. 11). When the second outboard inflator 62e (second inboard inflator 62i) is operated, a certain amount of gas is discharged to deploy the outboard airbag 17e (the inboard airbag 17i) to the extent that the upper face of the outboard airbag 17e (the inboard airbag 17i) reaches a prescribed height from the upper face of the seat cushion 3 (see dashed lines in FIG. 11). The height of the outboard airbag 17e (inboard airbag 17i) deployed by the second outboard inflator 62e (second inboard inflator 62i) is determined to the extent that the occupant is not compressed when the inboard airbag 17i and the outboard airbag 17e are deployed simultaneously.

The first inboard inflator 61i, the second inboard inflator 62i, the first outboard inflator 61e, and the second outboard inflator 62e each include an input part (not shown) to which a signal for controlling operation is input and the input part is respectively connected to the input/output port of the control device 22. Thereby, the control device 22 can independently control a deploying amount including the presence/absence of the deployment of the inboard airbag 17i and the outboard airbag 17e and the size of the inboard airbag 17i and the outboard airbag 17e at the time of the deployment.

Figure 4:
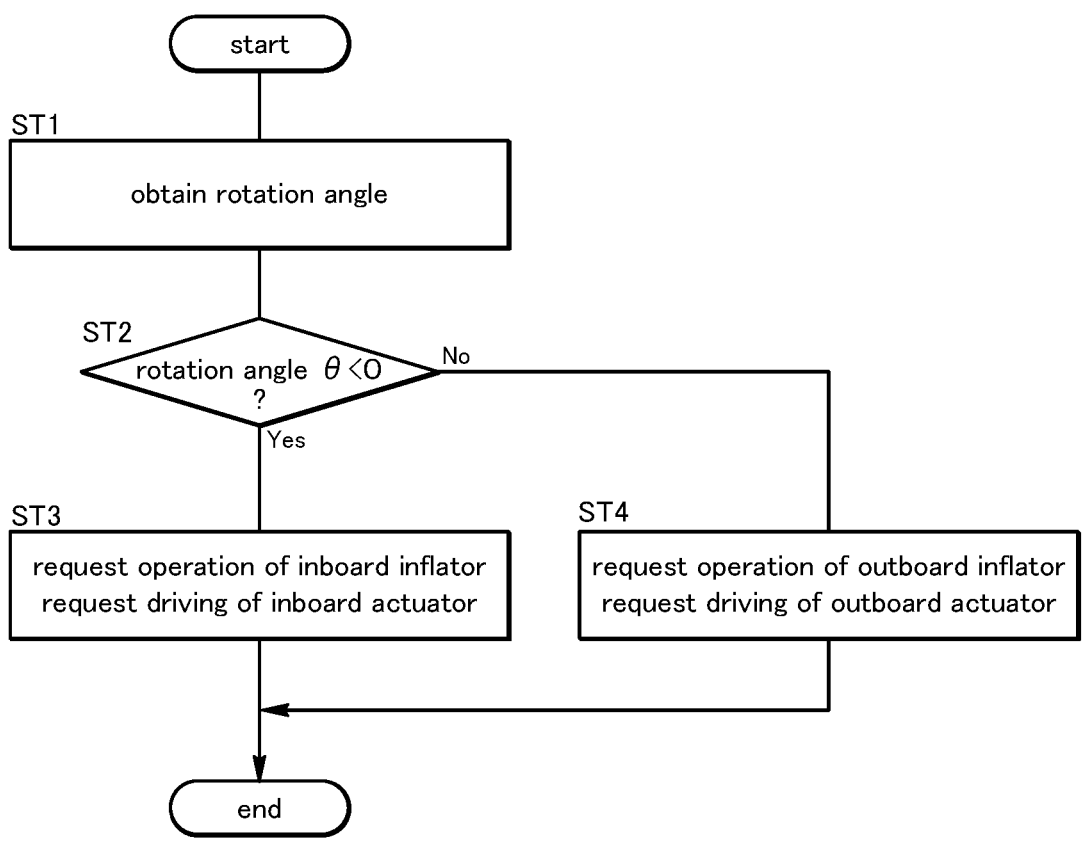
FIG. 4 is a flowchart of an airbag deploying process of the vehicle seat according to the first embodiment.
Figure 12:
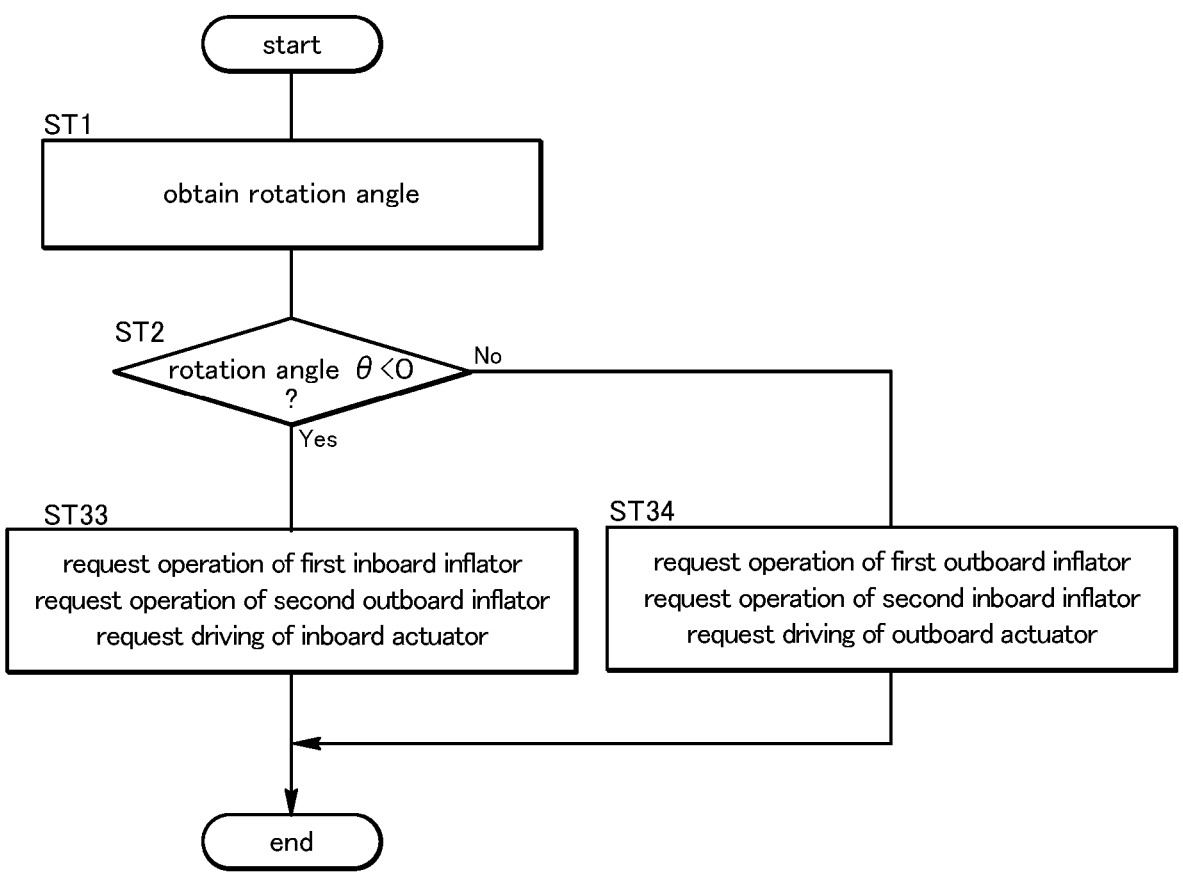
FIG. 12 is a flowchart of an airbag deploying process of the vehicle seat according to the fourth embodiment.

As shown in FIG. 12, instead of step ST3 in FIG. 4, the control device 22 sends signals that request operation to the first inboard inflator 61i and the second outboard inflator 62e and a signal that requests driving to the inboard actuator 20i (step ST33). Instead of step ST4 in FIG. 4, the control device 22 sends signals that request operation to the first outboard inflator 61e and the second inboard inflator 62i, and sends a signal that requests driving to the outboard actuator 20e (step ST34).

As shown in FIG. 3, the occupant moves to the inboard side at the time of the front collision of the vehicle 2 when the seat body 6 is in a state of rotating inward. At this time, the inboard airbag 17i is deployed. The body of the occupant may collide with the inboard airbag 17i, and then bounce back to collide with the side wall of the vehicle body 2b. In the fourth embodiment, simultaneously with the deployment of the inboard airbag 17i, the control device 22 sends a signal that requests operation to the second outboard inflator 62e to deploy the outboard airbag 17e. The movement of the occupant to the outboard side is restricted by the deployment of the outboard airbag 17e, so that the collision of the occupant with the side wall of the vehicle body 2b is prevented.

Concrete embodiments of the present invention have been described in the foregoing, but the present invention is not limited by the foregoing embodiments and various modifications are possible. In the first embodiment, only one of the inboard airbag 17i and the outboard airbag 17e is deployed, but the timing of the deployment of the outboard airbag 17e and the inboard airbag 17i may be controlled. For example, in step ST3 of the first embodiment, the control device 22 may send a signal that requests operation to the inboard inflator 18i after a prescribed time elapses from sending a signal that requests operation to the outboard inflator 18e. In this way, by deploying one of the inboard airbag 17i and the outboard airbag 17e first and the other of the inboard airbag 17i and the outboard airbag 17e later, the occupant having been bounced against either of the airbags 17 deployed first can be prevented from colliding with the adjacent occupant and the vehicle body 2b.

In the first embodiment, the deployment of the airbags 17 is controlled regardless of magnitude of acceleration applied to the seat body 6 at the time of the collision, but modes of the deployment of the airbags 17 may be changed depending on the magnitude of the acceleration. Preferably, the outboard airbag 17e may be deployed when the magnitude of the acceleration applied to the seat body 6 at the time of the collision is equal to or greater than a prescribed threshold value and the rotation angle is within the inward rotation range. The inboard airbag 17i may be deployed when the magnitude of the acceleration is equal to or greater than the prescribed threshold value and the rotation angle is not within the inward rotation range. The inboard airbag 17i may be deployed when the magnitude of the acceleration is smaller than the threshold value and the rotation angle is within the inward rotation range. The outboard airbag 17e may be deployed when the magnitude of the acceleration is smaller than the threshold value and the rotation angle is not within the inward rotation range.

In the above embodiment, the actuators 20 that can be extended/contracted are provided on either lateral side edge of the seat cushion 3, but any mode may be employed to lift the occupant's thigh and tilting the occupant's posture in the lateral direction relative to the seat body 6. For example, as shown in FIG. 13, posture control airbags 71i and 71e and posture control inflators 72i and 72e for deploying the posture control airbags 71i and 71e may be provided between the bottom frame BF and the pad 19P. At this time, the posture control airbags 71i and 71e and the posture control inflators 72i and 72e may be housed in the casings 70i and 70e, and the casings 70i and 70e may be disposed on an upper face of the bottom frame BF. At this time, a pair of left and right new slits 19C may be provided at a position substantially below the thighs of the occupant on the upper face of the seat cushion, and the skin material 19S covering the slits 19C may be provided with stitched portions (not shown).

When the posture control airbags 71i and 71e are deployed by operation of the posture control inflators 72i and 72e, the posture control airbags 71i and 71e pass through the slits 19C, break the stitched portions of the skin material 19S, and protrude from either lateral side edge of the seat cushion 3 (see one-dot chain lines in FIG. 13). At this time, the thighs of the occupant are lifted by the deployment of the posture control airbags 71i and 71e. In this way, the posture control airbags 71i and 71e have the same function as the actuators 20. Further, the slits 19C and the stitched portions are not essential, and any mode may be employed to push up the pad 19P and to lift the thighs of the occupant by deploying the posture control airbags 71i and 71e.

In the fourth embodiment, the control device 22 can independently control the deploying amount including the presence/absence of the deployment of the inboard airbag 17i and the outboard airbag 17e and the size of the inboard airbag 17i and the outboard airbag 17e at the time of the deployment, but the control device 22 that can control the size of the inboard airbag 17i and the outboard airbag 17e at the time of deployment may be applied to the second embodiment and the third embodiment. At this time, one of the inboard airbag 17i and the outboard airbag 17e that is not deployed in the second embodiment and the third embodiment may be deployed smaller than another of the inboard airbag 17i and the outboard airbag 17e that is deployed therein.

In the above embodiment, the example that the present invention is applied to the driver's seat is shown, but the present invention is not limited to the driver's seat and may be applied to the passenger seat. At this time, forward movement of the occupant may be restricted by providing an airbag in a dashboard. Further, when the present invention is applied to the rear seat, the front seat may be provided with an airbag that is deployed rearward to restrict forward movement of the occupant.

In the above embodiment, the control device 22 is provided on a lower side of the seat cushion 3, but the present invention is not limited to this mode. For example, the control device 22 may be provided in the vehicle body 2b such as the floor 7.

GLOSSARY OF TERMS

1: vehicle seat
2b: vehicle body

3: seat cushion
6: seat body
15: rotation angle sensor (rotation angle detecting device)
17: airbags
17e: outboard airbag
17i: inboard airbag
20: actuators
20e: outboard actuator
20i: inboard actuator
22: control device
50: acceleration sensor (acceleration detecting device)

The invention claimed is:

1. A vehicle seat comprising:
a seat body including a seat back and a seat cushion supported by a vehicle body so as to be rotatable around a substantially vertical axis;
a pair of airbags provided on either lateral side edge of the seat body and configured to deploy to respective lateral sides of an occupant seated on the seat body;
a rotation angle detecting device provided on the seat body and configured to detect a rotation angle of the seat body relative to the vehicle body;
a three-point seat belt provided on the seat body with two anchor points and one buckle, wherein the two anchor points serve as fixing points of the seat belt and are respectively provided on an outboard upper end of the seat back and an outboard side portion of the seat cushion, and wherein the buckle serves as a fixing point of the seat belt and is provided on an inboard side portion of the seat cushion;
a control device configured to control a deploying operation of the respective airbags independently of each other, the deploying operation including a deploying amount and/or a deploying timing, and
a pair of actuators provided in a seat cushion of the seat body and configured to protrude independently on respective lateral side edges of an upper face of the seat cushion,
wherein the control device is configured to individually control the deploying operation of the pair of airbags according to the rotation angle detected by the rotation angle detecting device,
wherein the control device is configured to make a deploying amount of the airbag located on an inboard side larger than a deploying amount of the airbag located on an outboard side when the rotation angle is within an inward rotation range in which the front end of the seat body is located on the inboard side at the time of a collision, and
wherein the control device is configured to make the actuator located on the inboard side protrude when the rotation angle is within the inward rotation range at the time of the collision and to make the actuator located on an outboard side protrude when the rotation angle is out of the inward rotation range at the time of the collision, the respective actuator thereby acting to guide an occupant forward relative to the vehicle body during the collision.

2. The vehicle seat according to claim 1, wherein the control device is configured to make the deploying amount of the airbag located on an outboard side larger than the deploying amount of the airbag located on the inboard side when the rotation angle is out of the inward rotation range at the time of the collision.

3. The vehicle seat according to claim 2, wherein the seat cushion includes a frame and a pad covering the fame, and the actuators are provided between the frame and the pad, and the actuators extend upward in a substantially vertical direction to push up the pad so that respective lateral side portions of an upper face of the seat cushion protrude.

4. The vehicle seat according to claim 1, wherein an additional airbag is provided forward of the vehicle seat relative to the vehicle body so as to restrict forward movement of the occupant relative to the vehicle body.

* * * * *